United States Patent [19]

Shi

[11] Patent Number: 5,377,205

[45] Date of Patent: Dec. 27, 1994

[54] FAULT TOLERANT CLOCK WITH SYNCHRONIZED RESET

[75] Inventor: Fong Shi, Kirkland, Wash.

[73] Assignee: The Boeing Company, Seattle, Wash.

[21] Appl. No.: 48,658

[22] Filed: Apr. 15, 1993

[51] Int. Cl.⁵ .......................... G06F 11/08; H04L 7/00
[52] U.S. Cl. ..................................... 371/36; 371/47.1; 371/61; 375/108
[58] Field of Search ............ 371/36, 61, 47.1; 307/441, 269; 375/108

[56] References Cited

U.S. PATENT DOCUMENTS

| | | | |
|---|---|---|---|
| 3,619,662 | 11/1971 | Vachon | 307/269 |
| 3,737,674 | 6/1973 | Butler, Jr. | 307/204 |
| 3,900,741 | 8/1975 | Fletcher et al. | 307/204 |
| 4,239,982 | 12/1980 | Smith et al. | 307/269 |
| 4,375,683 | 3/1983 | Wensley | 371/36 |
| 4,480,198 | 10/1984 | Gass | 307/269 |
| 4,600,845 | 7/1986 | McKenna, Jr. | 307/269 |
| 4,644,498 | 2/1987 | Bedard et al. | 364/900 |
| 4,683,570 | 7/1987 | Bedard et al. | 371/36 |
| 4,696,019 | 9/1987 | Tulpule et al. | 375/107 |
| 4,779,008 | 10/1988 | Kessels | 307/269 |
| 4,839,855 | 6/1989 | Van Driel | 364/900 |
| 4,979,191 | 12/1990 | Bond et al. | 375/108 |
| 4,984,241 | 1/1991 | Truong | 371/36 |
| 5,117,442 | 5/1992 | Hall | 375/107 |

OTHER PUBLICATIONS

Sawada et al., "Highly Reliable Clock Generators," *International Journal of Mini and Microcomputers*, vol. 13, No. 2, 1991, pp. 53–56.

*Primary Examiner*—Paul Gordon
*Attorney, Agent, or Firm*—Christensen, O'Connor, Johnson & Kindness

[57] ABSTRACT

A fault tolerant clock system that includes voting of power-on and other reset signals to ensure tight synchronization. A fault tolerant clock system (10) includes four channels, providing tolerance to a catastrophic failure in one of the channels and a second fault in another channel. Each clock channel comprises a crystal oscillator (12), an RC circuit (14), and a gain circuit (16) that are connected in a feedback loop with a first voter module (18). The first voter module produces a voted time base output signal corresponding to a majority vote of the timing signals provided by each of the four clock channels. This voted time base signal is fed back to the crystal oscillator through the RC circuit. The RC circuit enhances the frequency pulling capability of the crystal oscillator, enabling its timing signal to be phase shifted over a relatively wide range so that it can be kept in phase and frequency synchronization with the timing signals from crystal oscillators in the other clock channels without need for critically trimming components. A second voter module (34) determines a majority vote of reset signals from each of the clock channels, and the voted reset signal is applied to an enable circuit (24) to reset the fault tolerant clock system. A power-on reset circuit (28) controls the duration of reset signal in each channel following a reset caused by application of power to the clock channel or due to manual or other resets, thereby providing sufficient time to enable the power supply and crystal oscillator to stabilize before the time base output signal of the clock channels is again enabled. The enable signal is processed through an optional deglitching circuit 22, which masks out possible glitches on the reset line. Preferably, the fault tolerant clock system is produced on an ASIC to achieve redundancy at the chip level.

21 Claims, 2 Drawing Sheets

FAULT TOLERANT CLOCK WITH SYNCHRONIZED RESET

FIELD OF THE INVENTION

This invention generally pertains to a fault tolerant system with multiple redundant components, and more specifically, to a fault tolerant clock system having a plurality of clock channels.

BACKGROUND OF THE INVENTION

Multiple redundant critical systems are often used in aircraft and aerospace applications where there is a need for safety, low maintenance, and reliability. A single backup system is generally not sufficient where disagreements may exist between two nominally functional systems, since the failed system may not be easily identified. For this reason any critical system, such as the avionics instrumentation package on an aircraft, typically includes three or more redundant microprocessors running in parallel. The failure of one of the microprocessors can then be detected by comparison of its output to that of the other microprocessors.

Each microprocessor in a redundant system requires an accurate time base reference, and separate time base clock channels are normally included for each one. Because the microprocessors operate in parallel and their outputs are synchronously compared in real time, it is important that the time bases for the microprocessor also be synchronized. A comparison of the outputs from multiple processors will indicate an error if one of the microprocessors is fetching an instruction to execute, which the other microprocessor has already executed. A fault in any of the clock channels may seriously impact the synchronization of the other clock channels, and thus undermine the proper operation of the entire redundant microprocessor system.

A clock channel fault may comprise an intermittent connection, a shift in the frequency of one of the clock channels due to environmental effects, or a component failure in the circuitry of one of the clock channels. Such faults can also be caused by intermittent problems, e.g., a cold solder joint, or by changes in an electrical parameter of one of the components in a clock channel over time. In the worst case, one of the clock channels may fail completely, effectively terminating operation of the microprocessor to which it is connected as a time base. Clearly, it is desirable that the redundant clock system be able to tolerate a limited number of faults without loss of synchronization of the clock channels that continue to operate properly. Ideally, all channels should continue to produce a synchronized time base output signal even if one or more components have failed.

Initially, it might seem a simple matter to accommodate one or more faults in a redundant clock system, since the clock channels that are operating without faults can be used to synchronize the time base signals for all of the microprocessors. In fact, the problem and its solution is not trivial, particularly where the fault does not represent a catastrophic failure of one clock channel. If the fault in one clock channel is not easily detectable, it may cause different erroneous signals to be provided to the other clock channels, making synchronization virtually impossible.

The task of synchronizing clock channels is analogous to a classic exercise in logic known as the Byzantine Generals' Problem. In the Byzantine Generals' Problem, the Byzantine Army, separate divisions of which are controlled by one of several different generals, surrounds an enemy city. Communication between the generals is limited to oral messages carried by runners. One or more of the generals may be a traitor who will attempt to confuse the other generals by sending false messages. In the simple case where there are only three generals, its has been shown that a single traitor can confuse two loyal generals, leading to the theorem that more than two thirds of the generals must be loyal to guarantee that the loyal generals can properly reach agreement on a plan of battle.

By analogy to this classic problem, a single clock channel in which a fault appears can prevent two other clock channels from being correctly synchronized, if the fault causes a different time base signal to be conveyed to each of the properly operating clock channels during the attempted synchronization. Based on this theorem, at least four redundant clock channels are required in a clock system in order to tolerate a single fault. A more elegant solution, which apparently contradicts the theorem, permits four redundant clock channels to tolerate more than one fault. U.S. Pat. No. 4,979,191, Bond et al., Dec. 1990 (assigned to the same assignee as the present invention) discloses such a solution.

In this patent, four redundant clock channels are periodically synchronized after a counter in each of the channels has accumulated a predetermined number of clock cycles. Each clock channel includes a clock unit and an isolation port. The counter, which is in the clock unit, accumulates the predetermined number of clock cycles, disables the clock channel output signal, and produces a sync pulse that is input to a voter block, connected to receive the sync pulse from all of the clock channels. In response to a second sync pulse received from one of the other clock channels, the voter block produces a load pulse signal that is input to the isolation port of that clock channel. Corresponding isolated load signals are produced by the isolation ports for each clock channel and provided to another voter block in each clock unit. When the second isolated load signal is received from the other clock channels, the other voter block produces a load enable signal that is input to the counter, causing it to reset and begin counting again, and enabling the clock channel time base output signal, in synchronization with the other clock channels. Up to N simultaneous faults may be sustained in this clock system, without loss of synchronization in the clock channels that continue to operate properly, so long as $2N+1$ clock channels are provided. The only significant drawback to this technique is a limitation in speed, such that it is used only with relatively slow speed applications, such as input/output frame synchronization, and is not intended for use in higher frequency time base applications. It is also more complex than is desired for many applications and only periodically synchronizes the redundant clock channels.

Another commonly assigned patent, U.S. Pat. No. 4,984,241, through Jan. 1991, discloses a triple modular redundancy clock system. In this disclosure, three clocks can be synchronized within several nanoseconds of each other if the circuit components, e.g., oscillator trim capacitors, in each channel are carefully tuned. Since trimming one capacitor affects all three channels, this procedure must be repeated many times, until all channels are properly tuned, and is therefore extremely time consuming. Moreover, if environmental effects such as temperature cause a shift in the trimmed values of these components, oscillation synchronization of the clocks can no longer be maintained. Insufficient phase range in the feedback loop of the crystal oscillators employed in each channel limits the frequency range over which the oscillators can be pulled into synchronization. Furthermore, power-on automatic reset and automatic warm reset of the clock circuit were not implemented in this invention. It was also noted that the clocks in each channel could appear to be synchronized when in fact, they were an integer number of cycles out of synchronization, since each crystal has its own stabilization time period during power-up.

Accordingly, a simple multiple redundant fault tolerant clock system is required that can operate at relatively high clock frequencies, be Byzantine fault tolerant, and automatically synchronize at power-on or warm reset of the system. The system should be highly integrated and be capable of continuously maintaining each of the clock channel time base outputs in synchronization without the need for careful trimming of components, and without concern for maintaining such synchronization during operation within standard operating environmental ranges.

SUMMARY OF THE INVENTION

In accordance with the present invention, a fault tolerant clock system for producing a timing signal comprises a plurality of oscillators, each of which is associated with a different channel of a plurality of channels. Each oscillator is selected to produce an output signal having the same nominal frequency as the other oscillators. A plurality of first voters are included, each first voter being associated with a different channel and having a plurality of inputs. The inputs of each first voter are electrically coupled to receive the output signals from all of the oscillators; a voted output signal produced by each first voter and corresponding to a majority of the input signal is coupled into a feedback loop of the oscillator of the channel with which the first voter is associated to control the frequency of that oscillator. Also associated with a different one of the channels are a plurality of power-on reset circuits, each of which produces an enable signal for its channel after at least a minimum time has elapsed following application of a voltage to energize the fault tolerant circuit. This minimum time is selected to enable transients on the voltage and in the output signals of the oscillators to settle after the fault tolerant circuit is energized or reset. A plurality of second voters are each associated with a different channel. The second voters each have a plurality of inputs that are electrically coupled to the plurality of power-on reset circuits to receive the enable signals from all of the channels. In response to the enable signals from the plurality of channels, the second voters produce a voted output enable signal that enables a fault tolerant time base output signal from each channel. These time base output signals are synchronized, even though one or more faults have affected one of the channels.

In one embodiment, the fault tolerant circuit further comprises a plurality of filters, each filter being associated with a different channel and being coupled between the power-on reset circuit and second voter in its channel. The filters reduce or remove any noise present on the enable signal for their respective channels.

Preferably, the oscillator of each channel comprises a crystal having a resonant frequency corresponding to the nominal frequency. Each such oscillator further comprises a resistor (and capacitor connected in a network) electrically coupled in series with the crystal in the feedback loop of the oscillator to enhance frequency pulling. By providing additional phase compensation for each of the oscillators, they can more readily be synchronized to substantially the same frequency.

In addition, the power-on reset circuit preferably comprises a power-up timer that determines a duration of a reset signal. The power-on reset circuit in each channel responds to an externally provided reset command that resets the fault tolerant circuit by delaying production of the enable signal for a predetermined time after the reset command.

For one preferred form of the fault tolerant circuit, there are four channels and four oscillators that start up in synchronization and remain synchronized. If one channel has an open crystal, the first voters automatically default to three channel voting. Thus, the fault tolerant circuit is tolerant of one single channel fault plus a non-catastrophic fault in a second channel.

Output enable means are provided for each channel, coupled to receive the output enable signal. In response to the output enable signal, the output enable means enable the time base output signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
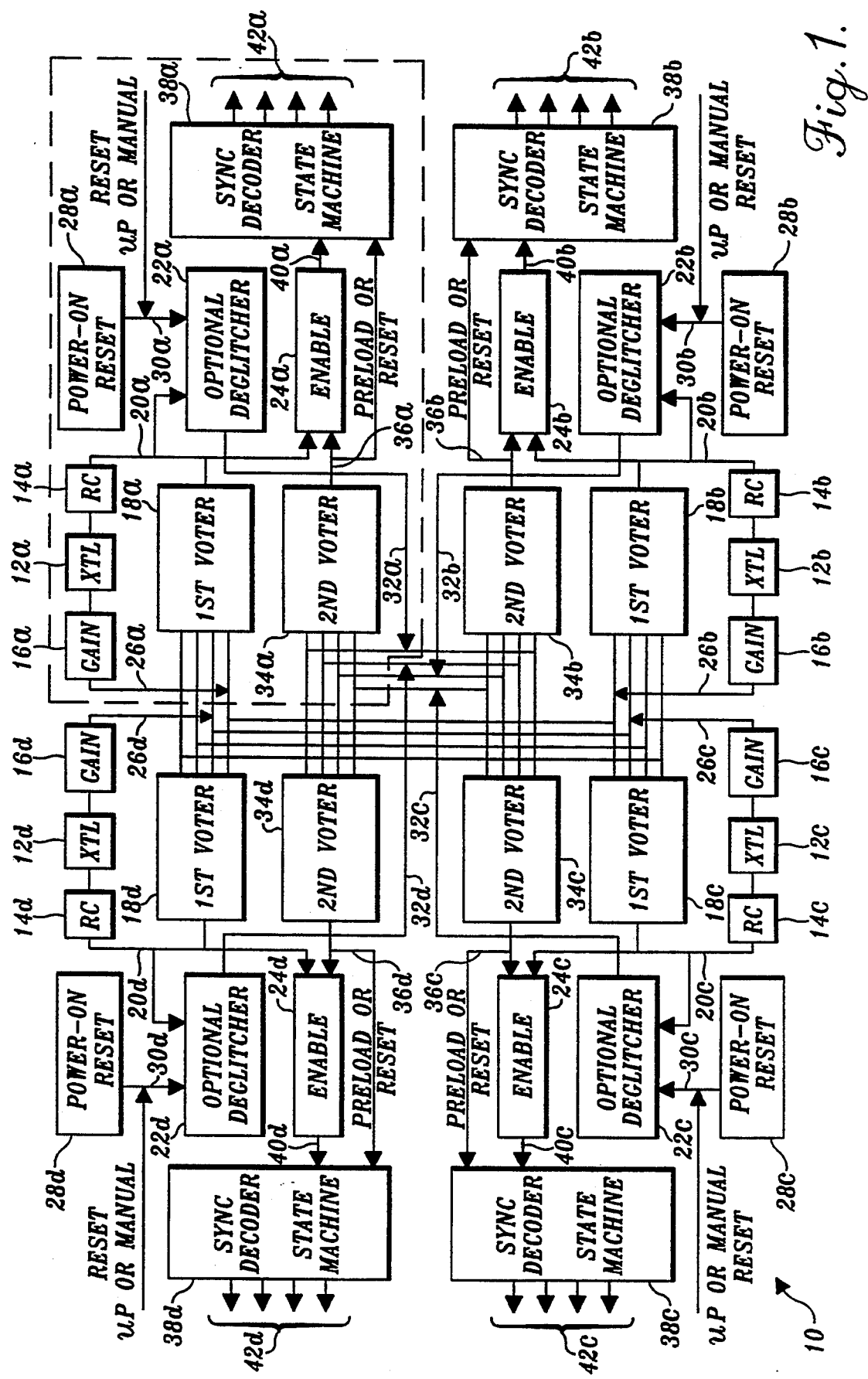
FIG. 1 is a schematic block diagram of a preferred embodiment of a four channel fault tolerant clock system in accordance with the present invention, as used to provide four synchronized time base signals to sync decoder circuits.

Referring to FIG. 1, a preferred embodiment of a fault tolerant clock system in accordance with the present invention is generally indicated at reference numeral 10. Fault tolerant clock system 10 comprises four identical channels that provide appropriate timing signals to other components (not shown), e.g., in a navigational system on an aircraft.

The number of channels or level of redundancy used in fault tolerant clock system 10 is selected to achieve a desired degree of reliability. In the preferred embodiment, a tradeoff was made between the number of catastrophic module faults that can be tolerated (e.g., failure of a crystal oscillator) and the requirements for additional hardware that a higher level of fault tolerance would require. If three channels had been provided instead of four, only a single module fault could be tolerated. Two module faults of any type could be tolerated if five channels had been used. The advantage of using four channels is so that the fault tolerant clock system can be automatically reconfigured to three channels if a single castastrophic fault occurs, and even such a reconfiguration to one less channel would still be tolerant of additional module faults. The additional faults can even include an open-crystal in another module, for example, due to poor or intermittent connections.

Furthermore, integrated voting buses are used in this invention. In the N-multiple redundancy (N/VIR) discrete approach of the prior art, voting buses are not integrated. Instead discrete voting buses are used and electro-static diodes (ESD) are typically provided. If one (or more) power supplies in a conventional prior art circuit of this type becomes faulty due, for example, to shorting or abnormal voltage levels, the ESDs that are associated with that faulty channel will load the voting buses and cause the entire system to fail. Current limiting resistor must therefore be used in series with the inputs to protect the bus—at a severe penalty in reduced speed.

In contrast to the discrete voting buses of the prior art, the preferred embodiment of fault tolerant clock system 10 is built as an application specific integrated circuit (ASIC) in which the voting buses are formed as metallized traces on a common semiconductor substrate. Since metallized voting buses are fabricated along with each isolated channel on one common substrate in the preferred embodiment of fault tolerant clock system 10, ESDs tied to the voter inputs are eliminated, and the speed penalty associated with use of current limiting resistors is avoided.

Loss of the power supply for one channel does not disable the operation and integrity of the time base signals produced by the other three channels in fault tolerant clock system 10. The preferred embodiment of fault tolerant clock system 10 was first conceptualized using a plurality of discrete integrated circuit components. As noted above, the current version of the four channel fault tolerant clock system was fabricated as an integral unit comprising only a single ASIC, thereby proving the concept of chip-level redundancy for this device.

To simplify reference to each of the elements comprising fault tolerant clock system 10, identical reference numerals have been used for like elements in each clock channel, but the common numeric portion of the reference numeral is followed by one of the letters "a" through "d" to identify an element in a specific dock channel. Thus, for example, each of the four clock channels includes a crystal oscillator, identified respectively by reference numerals 12a through 12d in the four clock channels. Where it is necessary to refer to one of the elements in a specific channel, the reference numeral for that element is used with a suffix letter; however, a more general reference is made to the element without regard to the channel in which it is located, simply by referring to it using only the numeric portion of the reference numeral, e.g., crystal oscillator 12

Each clock channel includes a resistance/capacitance (RC) circuit 14 that is connected in series with crystal oscillator 12 and with a gain circuit 16. The RC circuit and gain circuit comprise a portion of a feedback loop for crystal oscillator 12, the remainder of the feedback loop comprising a first voter module 18. In the preferred embodiment, first voter module 18 has four inputs, each input corresponding to the output signal from gain circuit 16, which amplifies the output of crystal oscillator 12. A first bus 26 (comprising lines 26a through 26d for each of the four channels, respectively) conveys the output from gain circuit 16 in each channel to the four inputs of first voter modules 18. Details of each of the first voter modules 18 are disclosed below.

Each of the first voter modules 18 determines a majority consensus of the output signals from gain circuits 16 and this voted signal is input to the corresponding RC circuit 14 in the channel through a line 20. Crystal oscillator faults are the most common type of fault in a clock system. The faults that can occur in the crystal used in a crystal oscillator include drift away from the crystal's nominal frequency, and open circuit condition due to vibration, shock, or corrosion. If one of crystal oscillators 12a through 12d should thus fail, the first voter module can still determine a consensus signal for each clock channel. This consensus signal is identical in phase and frequency to the consensus signals in the other clock channels, which are all based on the majority vote of the timing signals provided by the remaining three crystal oscillators. In fact, for the preferred embodiment of fault tolerant clock system 10 shown in FIG. 1, if one crystal open fault should occur, the fault tolerant clock system defaults to triple multiple redundancy mode (three channels). Up to two such open crystal oscillator faults can be tolerated, while still providing a consistent and identical output signal from first voter modules 18 in all four channels. In the circumstance wherein two crystal oscillators oscillate at one frequency and the other two at another frequency, total loss of synchronization between the four clock channels would occur only if the two different frequencies were outside the pulling range of the crystal oscillators.

In each clock channel, line 20 conveys the voted output or time base signal from first voter module 18 to an optional deglitching circuit 22, which delays propagation of a reset signal for that channel of the fault tolerant clock system for a predefined number of the time base clock periods. In addition, line 20 is coupled to an enable circuit 24. Enable circuit 24 includes two inputs. If enable circuit 24 has an appropriate enable signal (i.e., not during application of a reset signal) applied to one of its inputs, the voted time base output from first voter module 18 is conveyed on a line 40 from enable circuit 24 to a synchronous decoder state machine 38, which derives the individual timing signals used by the other external components to which fault tolerant clock system 10 is coupled.

The enable signal that controls enable circuit 24 is provided on a line 36 in each channel by a second voter 34. Each second voter 34 has four inputs that are coupled to a second bus 32 (comprising lines 32a through 32d). The second bus conveys any reset signals from optional deglitching circuit 22 in each channel. A clock channel reset signal can be produced in response to several events. For example, when power is first applied to energize fault tolerant clock system 10, or if power is interrupted and then reapplied, or if a manual or microprocessor provided reset occurs, a reset signal is produced in each clock channel. This reset signal is briefly delayed by optional deglitching circuit 22 (if the circuit is used) and is then supplied to one of the four inputs of second voter 34 in each channel. In response to the four (or less) reset signals provided to its inputs, each second voter module 34 produces a voted reset signal that is applied to enable circuit 24. When a voted reset signal is applied to enable circuit 24 that indicates the fault tolerant clock system has truly been reset, the enable circuit disables output of the time base signal. The voted reset signal output from second voter module 34 is also applied to synchronous decoder state machine 38 in each channel to reset the timing signals that are output from the synchronous decoder state machine on lines 42.

The reset signal developed when a clock channel is initially energized or powered up after a power interruption is provided by a power-on reset circuit 28 lasts about 350 milliseconds. This time delay is selected to allow crystal oscillators 12 sufficient time to stabilize and to ensure that any noise on the power supply and on the power-on reset signal has sufficient time to decay.

A faulty reset signal can occur in one or two clock channels under certain fault conditions, such as when an intermittent power supply interrupts power to a clock channel, or a faulty manual reset occurs. Use of second voter modules 34 ensures that reset of a clock channel can occur only in response to a majority vote of all of the reset signal lines input to the second voter module in the clock channel. The reset signals are voted to determine if two or more clock channels agree on resetting the fault tolerant clock system. It will also be understood that second voter module 34 in each channel can be modified so that agreement of three or more channels is needed to initiate a reset of the fault tolerant clock system.

Reset of a clock channel can also be manually initiated with a simple push-button switch (not shown in FIG. 1) or upon demand by a microprocessor or other external control (neither shown) to which the clock channel is connected (also not shown). Since certain types of faults can cause a reset signal to be developed at only one of the inputs to second voter module 34, use of a voted reset signal to control the output signal of each channel enhances the fault resistance of the system and enables all of the clock channels to be started up in synchronization following a reset of the fault tolerant clock system.

One of the more difficult problems associated with designing an effective fault tolerant clock system is maintaining an acceptable phase error between the timing signals of each of the redundant clock channels. For a system clock rate of approximately 50 MHz or higher, interchannel clock skew must typically be maintained to within one nanosecond. As noted above, prior art fault tolerant clock systems have been developed that synchronize the clock channels within several nanoseconds, but only if the circuit components are carefully trimmed and the trim does not change. However, drift of the components due to aging or environmental effects can cause unacceptable phase skew. This problem has been identified as being caused mainly by insufficient phase variability in the feedback loop of the crystal oscillators, resulting in a phase pulling range that is too limited. If one or more of the clock channels is trimmed very close to the parallel resonant frequency ($\omega_p$) of its crystal oscillator, variations in load and stray capacitance in the circuit can suddenly reverse the reactance of the crystal oscillator, causing its oscillation to stop or at least significantly affecting the phase relationship of its output timing signal.

According to the Barkhausen criteria, if the gain of an amplifier used in the feedback circuit of a crystal oscillator, multiplied by the transmission coefficient of the feedback circuit is $\geq 1$, and if the phase shift around the feedback loop $= n \times 360$ at a particular frequency (where n is an integer), oscillation of the crystal oscillator will normally occur at that frequency. The overall gain is typically much greater than unity, so that the phase of the signal becomes the important factor in obtaining oscillation. For a phase from 0° through 90°, the reactance value of a crystal is positive between its series resonant frequency ($\omega_s$) and its parallel resonant frequency ($\omega_p$). Logic gates and other elements used in the feedback loop of a crystal oscillator contribute to the propagation delay, which should be convened to degrees in phase and added to the loop phase shift.

The above theoretical discussion provides background information to facilitate understanding how fault tolerant clock system 10 achieves the required phase shift needed to maintain all of the crystal oscillators in phase synchronization uses in response to the voted signal from first voter modules 18. If a phase shift is required in the feedback loop of crystal oscillators 12, there must be an equal and opposite phase shift in the crystal oscillator. This correction takes the form of frequency pulling in the feedback loop. To ensure a wider range of frequency pulling that is shared by all of the crystal oscillators 12, RC circuit 14 establishes a lagging network in the feedback loop of the crystal oscillators, thereby providing additional phase compensation, so that a crystal oscillator oscillates away from $\omega_p$ toward $\omega_s$. This arrangement ensures that a relatively wide range of frequency/phase correction is available in each clock channel without the use of critically adjusted trimming components. Consequently, the components comprising the feedback loop for crystal oscillator 12 in each channel do not need trimming and components having relatively wide tolerances can be selected for use in the feedback loop.

Figure 2:
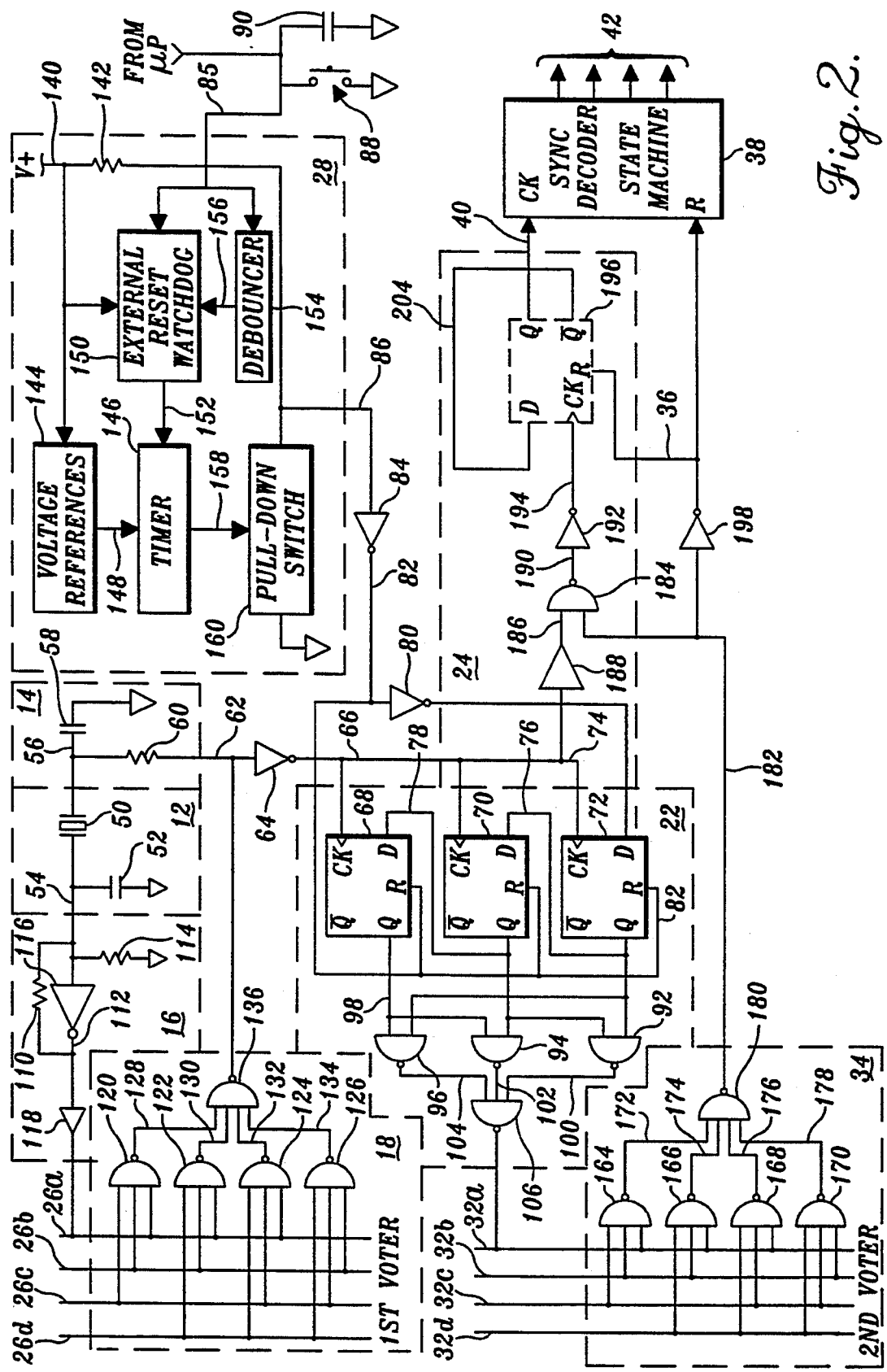
FIG. 2 is a schematic diagram of one clock channel of the fault tolerant clock system, each of the other three clock channels being substantially identical in design and layout.

Turning now to FIG. 2, details of the clock channel contained within the dash-line box in FIG. 1 are illustrated to represent in exemplary manner the components in each of the four clock channels. The logic illustrated in FIG. 2 is based on a standard NAND implementation consistent with the requirements of the CMOS process employed in the preferred embodiment of the present invention. Since FIG. 2 is exemplary of each clock channel, the suffix letters have been omitted from the reference numerals of most of the components. However, there are a few details that must be shown and discussed with reference to specific clock channel components. For example, first bus 26 includes lines 26a through 26d that connect to each clock channel in a slightly different manner; similarly, second bus 32 includes lines 32a through 32d that must be separately identified to clarify the relationship between the inputs to second voter 34 for a specific clock channel. In the exemplary clock channel illustrated in FIG. 2, line 26a completes the feedback loop through first voter 18, and line 32a provides the input to second voter module 34, for the specific clock channel illustrated. Each of the other clock channels are connected in comparable manner, with the feedback loop for crystal oscillator 12 being completed with the corresponding line 26b through 26d as appropriate for the clock channel in question and with the input signal to second voter 34 from optional deglitching circuit 22 coupled to the corresponding line 34b through 34d as appropriate for each different clock channel.

Attention is now directed to FIG. 2 and to crystal oscillator 12, which comprises a generally conventional time base crystal 50. Although capacitors 52 and 58 are shown coupled to both sides of the crystal, these capacitors include the inherent capacitance to ground of crystal 50. A line 54 connects one side of crystal 50 to gain circuit 16, and a line 56 connects the other side of crystal 50 to RC circuit 14. RC circuit 14 comprises capacitor 58 coupled between line 56 and ground, and a resistor 60, which is coupled between line 56 and a line 62; line 62 is connected to an inverter 64 and to the output of first voter module 18. The values of resistor 60 and capacitor 58 define an RC time constant for crystal oscillator 12. Resistor 60 limits the energy that excites the crystal, enabling the phase of the crystal oscillator to be shifted as necessary to synchronize it with the phase and frequency of the crystal oscillators in each of the other channels, in response to the voted time base signal output from first voter module 18. Reducing the excitation energy also prolongs the life of the crystal.

Gain circuit 16 completes the feedback loop of the crystal oscillator and comprises an inverter 116 having a gain that is greater than 1. A feedback resistor 110 connected between the output of inverter 116 (coupled to a line 112) and the input of the inverter (coupled to line 54) changes the inverter into a gain stage. A pull-down resistor 114 is connected between line 54 and ground. Resistors 110 and 114 set a bias voltage on line 54 below the threshold of gain inverter 116; the gain circuit provides a logic-low output signal when the associated crystal is open. A buffer 118 is connected in series between line 112 and line 26a.

First voter module 18 includes NAND gates 120, 122, 124, 126, and 136. Each of the first four NAND gates 120, 122, 124, and 126 has three inputs that are each coupled to one of the four lines 26a through 26d in different combinations. Specifically, NAND gate 120 has inputs connected to lines 26a, 26b, and 26c; NAND gate 122 has inputs connected to lines 26a, 26b, and 26d; NAND gate 124 has inputs connected to lines 26a, 26c, and 26d; and NAND gate 126 has inputs connected to lines 26b, 26c, and 26d. Each of these four NAND gates produces a logic level 0 output only if all three of the input signals to the NAND gate are at a logic level 1. Otherwise, the output of the NAND gates is a logic level 1. The outputs of NAND gates 120, 122, 124, and 126 are coupled to the four inputs of NAND gate 136. NAND gate 136 has a buffered output; it produces a logic level 0 only if the logic level of the signals applied to its four inputs are all at logic level 1; otherwise, its output is a logic level 0. The output of NAND gate 136 is coupled to line 62, to complete the feedback loop for crystal oscillator 12. First voter module 18 determines the majority consensus of the time base signals carried on first bus 26 and produces a valid majority time base output signal. Because of resistors 114 and 116, an open-circuit crystal fault automatically converts four channel voting to three channel voting. Normally, agreement between three of the time base signals carried on first bus 26 from the four channels is required to achieve a majority vote, where all of the signals are present, but one of the signals differs in phase/frequency from the others. Any slight variations in frequency/phase between the voted time base signal and the timing signal of the crystal oscillator are compensated by pulling in crystal 50 to the phase of the voted time base signal produced by first voter module 18. As a result, the time base signal on line 62 in all of the clock channels is identical in phase and frequency.

Much of the remaining circuitry of each clock channel in fault tolerant clock system 10 is directed to handling power-up and other types of resets. A reset of a clock channel can occur when a manual reset switch 88 is depressed, which results in grounding a line 85, thereby producing a logic level 0 on the line. Alternatively, a reset can occur in response to a reset signal received from an external microprocessor (not shown).

To filter any noise on the reset signal from either an external microprocessor or from manual closure of switch 88, a capacitor 90 (optional) is externally connected in parallel to manual reset switch 88.

In addition, an internal debouncer circuit 154 provides additional filtering of the reset signal and is coupled through a line 156 to an external reset watchdog circuit 150, which enables a timer 146 for a reset of a predefined duration following application of power to this channel of the fault tolerant clock system 10, or following initiation of other types of resets of the clock channel. External reset watchdog circuit 150 is connected to the external reset devices. A pull-down switch 160 is connected through a resistor 142 to a lead 140, which is coupled to a DC voltage source V+ used to energize the fault tolerant clock system. Line 140 also connects to a voltage references circuit 144 and to external reset watchdog circuit 150. Voltage references circuit 144 provides a signal to timer 146 through a lead 148 to initiate a reset of the clock channel if the voltage on lead 140 is less than a predefined minimum, e.g., <4.0 VDC on a nonfinal 5 VDC power supply. Timer 146 is preset to provide a time interval for the reset of approximately 350 milliseconds after receiving this signal, thereby enabling initial perturbations in the supply voltage to settle out or decay. After this time interval has elapsed, the timer produces a signal that is conveyed on a lead 158 to a pull-down switch 160, terminating the reset by causing the pull-down switch to open. While pull-down switch 160 is closed, a logic level 0 reset signal is present on a line 86, which is connected to the pull-down switch. The external reset watchdog circuit monitors the external reset devices and starts the timer if an external reset is initiated.

A logic level 0 on line 86 will reset all DQ flip flops and hold line 32 low. As long as two or more of the four lines comprising second bus 32 are held low, the output of second voter 34 will be held low to disable the time base signal. A rising edge of the reset signal indicates the termination of the reset request. When the signal on line 86 changes from low to high, the output signals on the Q terminals of the DQ flip flops comprising deglitching circuit 22 depend on the results of consecutive clocking of the time base signal. A simple majority of the signals developed on the Q terminals of these DQ flip flops determines when the logic level on one of the lines 32 changes from a low to a high. Glitches on line 86 are eliminated as a result of masking. Additional optional deglitchers 22 can be cascaded in multiple stages in each channel for even greater deglitching capability.

The low-active reset signal on line 86 is conveyed to an inverter 84, which inverts it to a logic level 1, and the inverted reset signal is carried on a lead 82 to deglitching circuit 22, and to an inverter 80. Inverter 80 again inverts the inverted logic level 1 reset signal to a logic level 0 and supplies that signal to the D terminal of a DQ flip-flop 72. The logic level 1 signal conveyed on lead 82 is input to the reset terminals of DQ flip-flops 68, 70, and 72, resetting all of their Q terminals to logic level 0. The clock terminals of DQ flip-flop 68, 70, and 72 are connected to lead 66, which conveys an inverted voted time base output signal from an inverter 64. When the reset signal is terminated at the next leading edge of this time base signal on lead 66, DQ flip-flop 72 shifts the logic level on its D terminal to its Q terminal, which is connected to one input of a NAND gate 92, one input of a NAND gate 96, and to the D terminal of DQ flip-flop 70. The other input of NAND gate 92 is connected to the Q terminal of DQ flip-flop 70. On the next leading edge of the time base signal, the logic level applied to the D terminal of DQ flip-flop 70 is output on its Q terminal. The Q terminal of DQ flip-flop 70 is also connected to one input of a NAND gate 94 and to the D terminal of DQ flip-flop 68. Finally, on the next leading edge of the voted time base signal, the logical level applied to the D terminal of DQ flip-flop 68 is output on its Q terminal, which is connected through a line 98 to one input of a NAND gate 96 and to the second input of NAND gate 94. The output signals of NAND gates 92, 94, and 96 are conveyed on lines 100, 102, and 104, respectively, to the inputs of a NAND gate 106. If any of the inputs of NAND gate 106 are at a logic level 0, its output is a logic level 1. Accordingly, it will be apparent that deglitching circuit 22 immediately propagates the reset signal onto line 32a of second bus 32, but delays terminating the reset signal at the output of NAND gate 106 by up to three periods of the time base signal, i.e., until all three of its inputs are again at a logic level 1. NAND gates 92, 94, 96, and 106 can be configured differently to achieve different deglitching patterns.

The reset signals in each clock channel are separately conveyed on lines 32a through 32d into different inputs of NAND gates 164, 166, 168, and 170, which together, comprise second voter 34. It should be noted that deglitching circuit 22 is not required if noise or contact bounce is non-existent on line 86. If deglitching circuit 22 is omitted, the signal on the output of inverter 80 is applied directly to second bus 32 from each of the channels of fault tolerant clock system 10, without the propagation delay and buffering provided by deglitching circuit 22.

In second voter 34, NAND gate 164 has its inputs coupled to lines 32a, 32b, and 32c; NAND gate 166 has its inputs coupled to lines 32a, 32b, and 32d; NAND gate 168 has its inputs coupled to lines 32a, 32c, and 32d; and NAND gate 170 has its inputs coupled to lines 32b, 32c, and 32d. During a valid reset of the fault tolerant clock system, the signals on at least two of lines 32a through 32d are at a logic level 0, causing the output of NAND gates 164, 166, 168, and 170 to be at a logic level 1. The logic level 1 from each of these NAND gates is applied to a separate input of a NAND gate 180 in second voter module 34, causing its output to become a logic level 0 as the reset signals from the four clock channels are voted. Resets in any one clock channel can be randomly generated without causing a reset of the fault tolerant clock system. However, if two or more of the clock channels provide simultaneous reset signals to second voter modules 34, a reset of all clock channels of fault tolerant clock system 10 occurs. Second voter 34 can be reconfigured with a simple logic inversion, so that fault tolerant clock system 10 resets if three or more of the channels agree to reset.

The logic level 0 signal output on line 182 when a system-wide reset has occurred, i.e., the voted reset signal, is applied to enable circuit 24 and to an inverter 198, having an output coupled through a line 36 to synchronous decoder state machine 38 and to enable circuit 24. In the absence of a voted reset signal, the logic level 1 signal conveyed on line 182 to enable circuit 24 from second voter module 34 comprises an enable signal causes the enable circuit to pass the voted timing signal for the clock channel to synchronous decoder state machine 38. When the enable signal changes state (to a logic level 0) to indicate that a voted reset has occurred, the enable signal terminates and becomes the voted reset signal, which stops the enable circuit from conveying a voted timing signal. Up to a three clock period delay is provided by deglitching circuit 22. The voted enable signal is reproduced after a valid reset signal has terminated, and the voted timing signal is again allowed by enable circuit 24.

Enable circuit 24 includes a buffer 188, a NAND gate 184, an inverter 192, and an optional DQ flip-flop 196. Buffer 188 conveys the time base signal carried on line 66 to one input of NAND gate 184, the other input being connected to line 182 to receive the reset signal conveyed thereon. When both inputs of NAND gate 184 are at a logic level 1, its output is a logic level 0; otherwise, it has a logic level 1 output. The output terminal of NAND gate 184 is connected through a line 190 to an inverter 192, which inverts its logic. The output of inverter 192 is connected to the clock terminal of optional DQ flip-flop 196. A $\overline{Q}$ terminal of optional DQ flip-flop 196 is coupled back to its D terminal, and its Q terminal is coupled through line 40 to synchronous decoder state machine 38. Each time that the logic level changes on line 194, the logic level that is coupled to the D terminal of optional DQ flip-flop 196 appears on its Q terminal. The optional DQ flip flop ensures a 50% ON/OFF time clock waveform on line 40, upon termination of the reset signal. All synchronous decoder and state machines 38 thus get a complete clock signal, even at high operating frequencies. Thus, the signal applied to synchronous decoder state machine 38 corresponds to the time base signal, so long as a logic level 0 voted reset signal is not being applied to NAND gate 184. When the voted output signal of second voter module 34 is a logic level 1, the voted time base signal can again propagate through NAND gate 184 and DQ flip-flop 196 to synchronous decoder state machine 38.

The voted reset signal (or enable signal) is inverted by inverter 198 and the inverted signal is applied to the reset terminal of DQ flip-flop 196 over line 36 to ensure that the DQ flip-flop is reset in response to a reset signal. In addition, the inverted voted reset signal provided by second voter module 34 is also applied to synchronous decoder state machine 38 to reset it, which always places the synchronous decoder and state machine in a known logic state. Upon termination of the reset, the synchronous decoder and state machine receives the time base signal that is passed through optional DQ flip-flop 196 and moves to the next state. Therefore, all four synchronous decoders and state machines are synchronized clock-by-clock at any given time. Each synchronous decoder and state machine 38 generates a group of clock signals and phase clocks, which are required by the system design.

Voting of the reset signals in second voter module 34 in each channel ensures that spurious resets caused by intermittent open circuits, noise, or non-synchronous external reset signals are ignored, while an actual power-on reset is handled effectively, after allowing for settling of crystal 50 and settling of any perturbations in the applied power supply voltage.

While the preferred embodiment of the invention has been disclosed in the above description, it will be appreciated that many changes can be made thereto within the scope of the claims that follow. Accordingly, it is not intended that the scope of the invention in any way be limited by the disclosure, but instead that it be determined entirely by reference to the claims.

The embodiments of the invention in which an exclusive property or privilege is claimed are defined as follows:

1. A fault tolerant circuit for producing a timing signal, comprising:
   (a) a plurality of oscillators, each oscillator being associated with a different one of a plurality of channels, each oscillator producing an output signal having the same nominal frequency;
   (b) a plurality of first voters, each of said first voters being associated with a different one of the plurality of channels and having a plurality of inputs, said inputs of each first voter being electrically coupled to receive the output signals from all of the oscillators, said first voters each producing a voted output signal that is coupled into a feedback loop of the oscillator of the channel with which the first voter is associated to control the frequency of that oscillator, said voted output signal corresponding to a majority of the output signals coupled to the inputs of the first voter from the plurality of oscillators;
   (c) a plurality of reset circuits, each reset circuit being associated with a different one of the plurality of channels and producing an enable signal for that channel after at least a minimum time has elapsed following a reset of the fault tolerant circuit, said minimum time being selected to enable transients on a supply voltage and in the output signals of the oscillators to settle; and
   (d) a plurality of second voters, each of said second voters being associated with a different one of the plurality of channels and having a plurality of inputs, said inputs of each second voter being electrically coupled to the plurality of reset circuits to receive the enable signals from all of the channels, said second voters each producing an output enable signal that enables a fault tolerant time base output signal from each channel, the time base output signals from all of the channels being synchronized, each said output enable signal corresponding to a majority of the enable signals coupled to the inputs of that second voter from the plurality of power-on reset circuits.

2. The fault tolerant circuit of claim 1, further comprising a plurality of filters, each filter being coupled between the reset circuit and second voter in one of the channels, to remove any noise present on the enable signal for that channel.

3. The fault tolerant circuit of claim 1, wherein the oscillator of each channel comprises a crystal having a resonant frequency corresponding to the nominal frequency.

4. The fault tolerant circuit of claim 3, wherein each oscillator further comprises a resistor-capacitor network electrically coupled in series with the crystal in the feedback loop of the oscillator, said resistor-capacitor network enhancing a frequency pulling capability of the oscillator to enable the plurality of oscillators to more readily be synchronized to substantially the same frequency.

5. The fault tolerant circuit of claim 1, wherein each reset circuit comprises a plurality of flip-flops connected in series, each flip-flop having a clock input coupled to the output signal of the oscillator of the channel with which the reset circuit is associated.

6. The fault tolerant circuit of claim 1, wherein each reset circuit comprises a timer, said timer determining a time duration of a reset signal started in response to application of a power supply voltage to a channel, and wherein the enable signal is in a disabled state for at least the duration of the reset signal.

7. The fault tolerant circuit of claim 1, wherein the reset circuit responds to an externally provided reset command that resets the fault tolerant circuit, said reset circuit delaying production of the enable signal for a predetermined time after the reset command.

8. The fault tolerant circuit of claim 1, wherein there are four channels and four oscillators, said fault tolerant circuit starting up and maintaining four synchronized time base output signals, in the presence of one faulty channel and an open circuit fault in an oscillator of another channel.

9. The fault tolerant circuit of claim 1, further comprising output enable means for each channel, coupled to receive the output enable signal from the second voter associated with each channel for enabling the time base output signal for each channel in response to the enable signal from the reset circuit.

10. A fault tolerant circuit for producing a timing signal, comprising:
   a plurality of clock channels, each clock channel including:
      (a) an oscillator operating at a selected nominal frequency, producing a timing signal;
      (b) first voter means, coupled to receive the timing signals from all of the oscillators in the plurality of clock channels, for determining a majority consensus of the timing signals in the form of a voted timing signal that is used to control the frequency of the oscillator in the clock channel, said first voter means reconfiguring for one less channel if an open circuit in one of the oscillators in the plurality of clock channels occurs;
      (c) reset responsive means, for producing an enable signal for [the]each clock channel after a predefined time delay following a reset of the clock channel and after power is applied to the fault tolerant clock system, to allow time for settling after the reset; and
      (d) second voter means, for producing a voted enable signal for the clock channel, in response to the enable signals from the reset responsive means in all of the clock channels, said voted enable signal enabling an output of the voted timing signal, said voted timing signal being thereby synchronized with the voted timing signals of all of the clock channels to enable an output timing signal from all of the clock channels in the presence of at least one fault.

11. The fault tolerant circuit of claim 10, wherein each clock channel further comprises a filter for filtering noise from the enable signal before it is applied to the second voter means.

12. The fault tolerant circuit of claim 10, wherein the reset responsive means include flip-flop means for delaying a reset signal for a predefined number of clock cycles of the oscillator in the clock channel, said second voter means producing a voted reset signal disabling the output of the voted timing signal from the clock channel.

13. The fault tolerant circuit of claim 10, wherein the oscillator in each clock channel comprises a crystal and wherein a feedback loop of the crystal includes a resistor-capacitor network that enhances frequency pulling to enable the voted timing signal to control the frequency of the crystal.

14. The fault tolerant circuit of claim 10, wherein each clock channel further includes enable means, coupled to the first voter means to receive the voted timing signal and to the second voter means to receive the voted enable signal, said enable means inhibiting the output of the timing signal until the voted enable signal is received.

15. The fault tolerant circuit of claim 10, wherein the oscillator in each clock channel includes the first voter means in a feedback loop, said feedback loop also including a resistor and a capacitor and being characterized by a gain at least equal to one, and a phase shift of $n \times 360$ degrees, where n is an integer.

16. The fault tolerant circuit of claim 10, wherein the first voter means in all of the clock channels are all coupled to a first bus for distribution of the timing signals from each oscillator in the plurality of clock channels to all of the first voting means.

17. The fault tolerant circuit of claim 16, wherein the second voter means in each of the plurality of clock channels are all coupled to a second bus for distribution of the enable signals, or conversely, of reset signals, from the reset responsive means in all of the clock channels to all of the second voting means.

18. The fault tolerant circuit of claim 17, wherein the first and second buses comprise metallized traces formed on a semiconductor substrate, thereby eliminating use of electro-static diodes to protect the first and second buses from power supply faults.

19. The fault tolerant circuit of claim 10, wherein the reset responsive means comprise a debouncing circuit that filters a reset signal.

20. The fault tolerant circuit of claim 10, wherein the plurality of clock channels are integrally formed on an application specific integrated circuit.

21. The fault tolerant circuit of claim 10, wherein the reset responsive means comprise a timing circuit that initiates the predefined time delay after power is applied to the fault tolerant clock system, and produces an enable signal after the predefined time delay has elapsed.

* * * * *

UNITED STATES PATENT AND TRADEMARK OFFICE
CERTIFICATE OF CORRECTION

PATENT NO. : 5,377,205
DATED : December 27, 1994
INVENTOR(S) : Fong Shi

It is certified that error appears in the above-indentified patent and that said Letters Patent is hereby corrected as shown below:

| COLUMN | LINE | |
|---|---|---|
| 5 | 7 | "(N/VIR)" should read --(NMR)-- |
| 5 | 46 | "dock" should read --clock-- |
| 8 | 5 | "convened" should read --converted-- |
| 10 | 22 | "nonfinal" should read --nominal-- |
| 11 | 4 | "I)" should read --D-- |
| 14 (Claim 9, | 19 line 4) | After "channel" insert --,-- |
| 14 (Claim 10, | 39 line 17) | "for [the]each" should read --for each-- |

Signed and Sealed this

Fourth Day of April, 1995

*Attest:*

BRUCE LEHMAN

*Attesting Officer*   Commissioner of Patents and Trademarks